E. I. DODDS.
STAY BOLT.
APPLICATION FILED SEPT. 21, 1912.
1,077,046.
Patented Oct. 28, 1913.
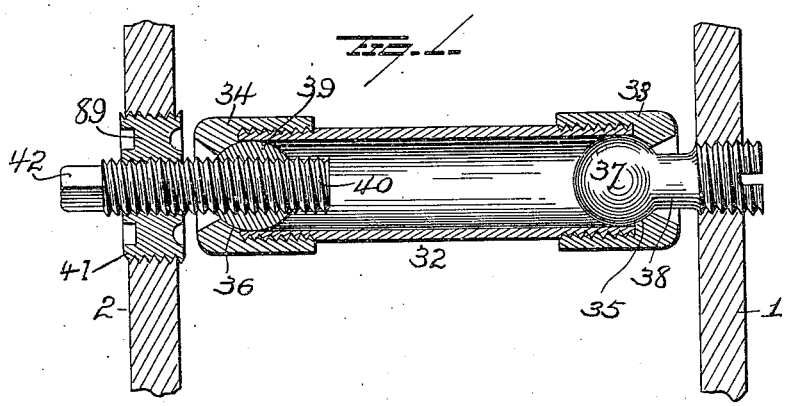
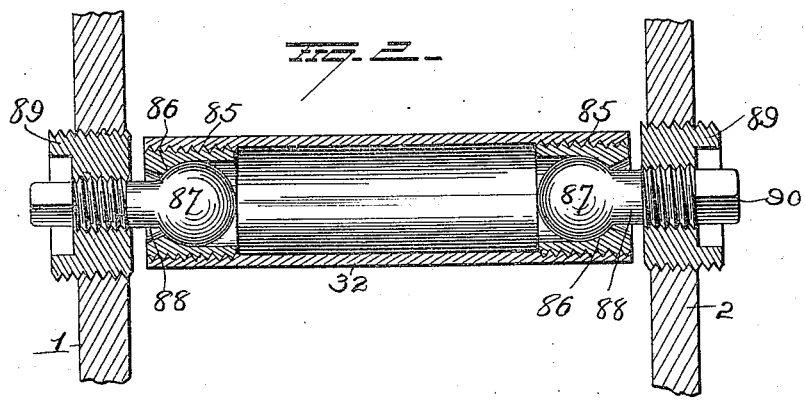
WITNESSES
INVENTOR
E. I. Dodds
By H. A. Seymour
Attorney

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,046.  Specification of Letters Patent.  Patented Oct. 28, 1913.

Original application filed September 25, 1911, Serial No. 651,051. Divided and this application filed September 21, 1912. Serial No. 721,668.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

In the accompanying drawing Figures 1 and 2 are views in longitudinal section of bolts embodying my invention.

1 represents the inside plate of a locomotive boiler, 2 the outside plate.

In both forms herein shown the bolt shank is hollow or tubular from end to end, and in the construction shown in Fig. 1 is threaded externally at its ends to receive the caps 33 and 34 screwed thereon, said caps being formed with concave seats 35 and 36 respectively located beyond the ends of bolt shank 32. The seat 35 is engaged by the spherical head 37 of the connector 38 that is screwed through the wall 1, and the seat 36 is engaged by a spherical nut 39 on a threaded stud 40 which has threaded engagement with a bushing 41 tapped into wall 2; the outer end of stud 40 being squared, as shown at 42 for the application of a wrench to secure the proper tensioning of the bolt.

The construction shown in Fig. 2, is quite similar to that shown in Fig. 1, except that the hollow bolt shank 32 is provided with internal bushings 85, in lieu of external caps, the said bushings having hemispherical seats 86, within the bolt shank, to receive the spherical heads of connectors 88, which latter are threaded through bushings 89 set into the walls 1 and 2, and are provided with squared ends for tensioning purposes.

It is evident that many slight changes might be resorted to in the relative arrangement of parts shown and described without departing from the spirit and scope of my invention as set forth in the claims annexed. Hence I would have it understood that I do not wish to confine myself to the exact construction and arrangement of parts shown and described, but Having fully described my invention what I claim as new and desire to secure by Letters-Patent, is:—

1. A stay bolt consisting of a hollow shank having a concave seat at each end, the seats being made separate from the shank, and connectors having spherical heads, the latter being within the hollow shank and resting against the concave seats.

2. A stay bolt consisting of a shank hollow from end to end and having concave seats detachably secured to the opposite ends of the shank, connectors each having a rounded head and threaded shank, the heads being within the hollow shank and bearing against the concave seats, and a threaded bushing through which one of said connector shanks passes.

3. A stay bolt comprising a hollow shank, concave seats having screw threaded connection with said shank and connectors having rounded heads for engagement with said seats, one of said heads having a screw thread connection with its connector.

In testimony whereof, I have signed this specification in the presence of two subscribing witnesses.

ETHAN I. DODDS.

Witnesses:
A. W. BRIGHT,
GEO. F. DOWNING.